Dec. 7, 1965    E. R. STRAIGHT    3,221,958
SAFETY BELT
Filed Aug. 1, 1963
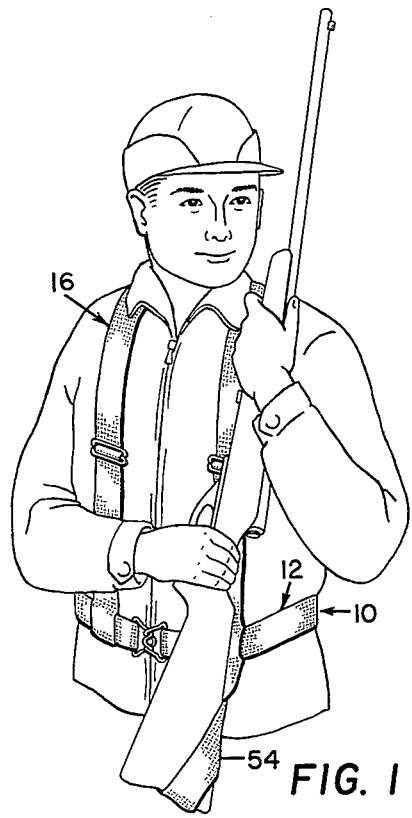
FIG. 1
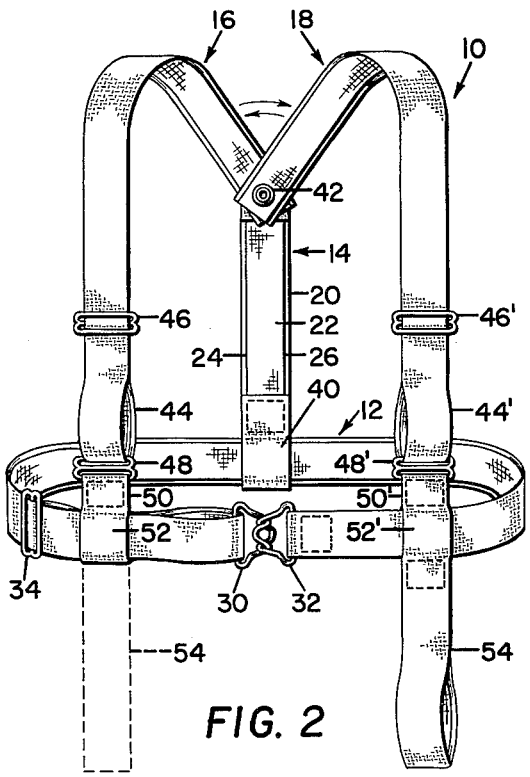
FIG. 2
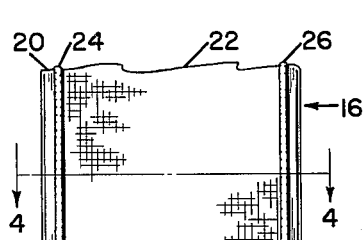
FIG. 3
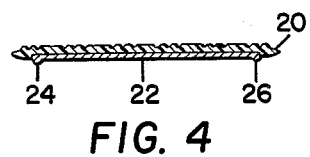
FIG. 4
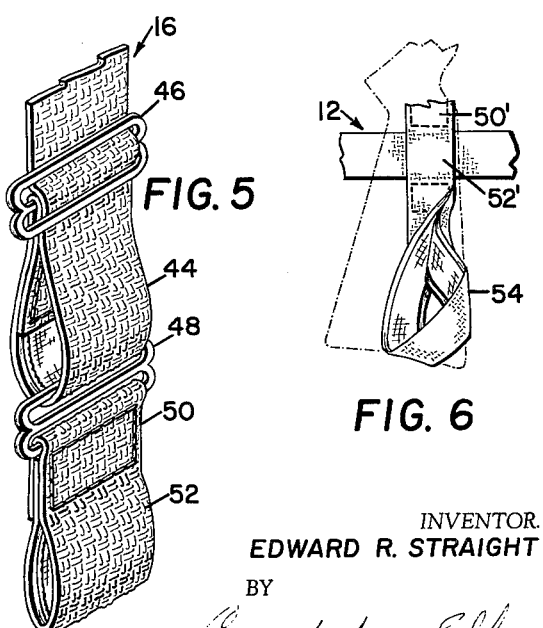
FIG. 5
FIG. 6
INVENTOR.
EDWARD R. STRAIGHT
BY
Compston & Shaw
HIS ATTORNEYS.

United States Patent Office 3,221,958
Patented Dec. 7, 1965

3,221,958
SAFETY BELT
Edward R. Straight, Penfield, N.Y., assignor to Vogt Manufacturing Corporation, Rochester, N.Y., a corporation of New York
Filed Aug. 1, 1963, Ser. No. 299,381
4 Claims. (Cl. 224—1)

This invention relates to a new, practical safety belt. More particularly, the invention relates to a safety belt having an intense and brilliant color, and that has an enhanced effectiveness for drawing attention to its wearer.

Belts of the general type to which this invention is addressed can be worn advantageously by individuals who must draw attention to themselves as a matter of safety or convenience. Some of the persons who might wish to use such a belt include, for example, traffic policemen, construction workers, hunters, bicycle riders, football referees, and the like.

One object of the present invention is to provide a high visibility safety belt having an enhanced effectiveness for directing attention to its wearer.

Another object of the invention is to provide a practical safety belt that is formed from a bright, eye-attracting material, that has greater apparent brightness or visibility than has been attained with prior belts and prior belt constructions.

A related object of the invention is to provide a cool, light, practical safety belt that is very durable and that will not rip, tear, or unravel, as a result of ordinary use.

Still another object of the invention is to provide a readily adjustable safety belt that is particularly convenient and useful for hunters. A related and more specific object of the invention is to provide a safety belt of the character described that is convenient for use by both left handed and right handed hunters.

A further object of the invention is to provide a safety belt that is unaffected by rain, snow, or sleet, and that is readily flexible even in cool or cold weather.

Yet another object of the invention is to provide a hunter's safety belt that includes means to which a license can be attached easily, for prominent display on the hunter's back.

Other objects of the invention will be apparent hereinafter from the specification and from the recital of the appended claims. To these and other ends, the invention resides in certain improvements and combinations of parts, all as will hereinafter be more fully described, the novel features of the invention being pointed out in the claims at the end of this specification.

In the drawing:

FIG. 1 is a fragmentary imaginative view showing a hunter wearing a safety belt that is constructed in accordance with one preferred embodiment of this invention;

FIG. 2 is a front elevation, on an enlarged scale, of this safety belt, showing by means of arrows and dashed lines how the relative positions of the two shoulder straps may be interchanged, to shift the carrying sling from one side to the other;

FIG. 3 is a fragmentary elevation, on an enlarged scale, of one of the shoulder straps, showing the inner surface of the strap, that is to be worn next to the body of the wearer;

FIG. 4 is a section taken on the line 4—4 of FIG. 3, looking in the direction of the arrows;

FIG. 5 is a fragmentary perspective view, on an enlarged scale, of the lower front end of the shoulder strap without the carrying sling; and FIG. 6 is a fragmentary front elevation of the lower front end of the shoulder strap that has the carrying sling, the sling being distorted as though having the butt of a gun stock inserted therein, and with the position of the gun stock indicated by dashed lines.

The preferred embodiment of the invention that is illustrated in the drawing is shown by way of illustration only. Referring now in detail to the drawing by numerals of reference, the numeral 10 denotes generally a safety belt that is constructed in accordance with a preferred embodiment of this invention. This safety belt comprises a waistband 12, a connector strap 14, and a pair of shoulder straps 16 and 18 respectively.

Each of these parts of the belt is formed from an elongate, flexible, ribbon-like strip of a particular laminated material. The structure of this laminate is best shown in FIGS. 3 and 4, and comprises an outer layer 20 that is formed from a ribbon-like film of a fluorescent synthetic plastic material that is integrally bonded, in face-to-face relation, to a slightly narrower web 22 of woven fabric. This fabric web 22 is formed with a non-raveling construction at its opposite lengthwise-extending edges, as indicated by the numerals 24 and 26 in the drawings. The fabric web 22 may be, for example, simple but strong woven cotton webbing. The plastic film 20 preferably is heat sealed to the webbing, to provide the laminated structure of fabric and film in continuous, face-to-face engagement.

As can best be seen in FIGS. 4 and 5, the outer surface of the plastic film 20 is embossed so that it has a rough appearance that is characterized by plurality of projecting portions and depressed portions, so that its surface area is greatly increased as compared to a flat film. Preferably, the plastic film is thin, to improve its flexibility at low temperatures.

The plastic film 20 preferably is formed from a vinyl plastic containing a fluorescent pigment or dye or the like. A preferred plastic material for use in the invention is a polyvinyl chloride film that contains a brilliant coloring material such, as, for example, blaze orange. This particular color is recognized as one of the most conspicious and for that reason is popular for use in safety applications. Preferably, the fabric web 22 is a bright white, to enhance the brightness of the plastic film.

A pair of detachable fastener sections 30 and 32 respectively are mounted at spaced locations on the waistband strap. The first fastener section 30 is mounted in a looped portion of the waistband, for sliding movement relative to the waistband, and the free end of the waistband loop is secured to the center bar of a suspender-type slide buckle 34, at a location remote from the fastener section 30. The main reach of the waistband is passed between the three bars of the slide buckle 34 in the usual fashion, to permit the looped portion of the waistband to be lengthened or shortened, to permit adjustment in the effective length of the waistband. The other fastener section 32 is secured in place at the other end of the waistband by short, looped portion of the waistband.

The lower end of the connector strap 14 is formed into a fixed loop 40 through which the back reach of the waistband is passed, so that the connector strap can slide along the length of the waistband to permit the position of the lower end of the connector strap to be adjusted.

The connector strap 14 is doubled back upon itself for a short distance at its upper end, and a grommet 42 is secured through this double thickness of the connector strap. A small part of the double-over connector strap extends above the grommet 42, to provide a tunnel loop though which a large safety pin can be passed easily, to secure a hunter's license in place. The back ends of the shoulder straps 16 and 18 are disposed over the upper looped end of the connector strap and are pivotally secured to it by the grommet 42.

The shoulder strap 16 is formed with a looped portion 44 at its front end. The end of this shoulder strap is secured to the middle bar of a slide buckle 46 that is mounted for sliding movement along the length of the shoulder strap. The lower end of the loop 44 is passed through a slot in a connecting link 48. A short length 50 of the same laminated material from which the rest of the belt is made is passed through the other end in the connecting link 48 and is folded over upon itself and is stitched in place to form a loop 52, through which the waistband is passed. The loop 52 is sufficiently large to permit relatively easy sliding movement of the loop along the length of the safety belt, and to permit the fastener section 30 to pass therethrough readily.

The shoulder strap 18 is constructed in a fashion similar to the shoulder strap 16, and in the drawings, its parts that are like those of the shoulder strap 16 are identified by like but primed numerals. However, the lower looped portion 52' of the shoulder strap 18 is formed with an elongate looped extension 54, to provide a carrying sling that is downwardly dependent from the shoulder strap, below the waistband. This sling or loop 54 is stitched together immediately below the waistband, so that the loop 52' is substantially the same size as the loop 52 of the other shoulder strap, for ease in movement along the length of the waistband.

When the belt is made from material that is formed by laminating a vinyl film to a woven cotton webbing backing, in accordance with the preferred embodiment of the invention, the vinyl film is hot-pressed against the cotton webbing, in order to obtain the proper bonding between these two layers, and as a part of the same operation, the film may be embossed with an embossing roller. The cotton webbing imparts much greater strength to the laminate than could be obtained, for example, by the use of a double thickness of vinyl film. The face-to-face seal between the film and the webbing bonds each strand of the backing in place, and essentially prevents unravelling; and the reinforcement that is provided by the webbing makes the laminate extremely resistant to ripping and tearing. Moreover, the use of a thin vinyl film enhances the flexibility of the belt and insures that the belt will not become as stiff or brittle in cold weather as would be the case were a double thickness of the vinyl film to be used instead of the laminate.

The vinyl film is embossed not only to improve the appearance of the belt, by applying an attractive pattern to it, but also to provide a multiplicity of small area, intersecting reflecting surfaces, so that the surface of the belt has a broad angle of reflection and radiation. This makes the belt more readily visible throughout a broader angular range, and makes the intensity of the reflected light more uniform, than is the case with a flat-surfaced belt. The use of white webbed backing enhances the light reflection.

The carrying sling can be used for a variety of purposes, but is particularly useful as a rest for the butt of a gun stock. To use the sling as a gun sling the stock of the gun is inserted into the sling from the outside, and the gun then may be carried conveniently either at the port arms or quarter arms position. The gun may be rapidly and easily removed from the sling for use.

The shoulder strap that is equipped with the carrying sling can be moved to either side of the wearer, by withdrawing the ends of the waistband through the loops 52 and 52' of the shoulder straps 16 and 18 respectively, and then pivoting the back ends of the shoulder straps about the grommet 42 so as to interchange their respective positions. Thereafter, the ends of the waistband are passed through the shoulder strap loops 52' and 52, respectively, and the safety belt is again ready for use.

The suspender-type slide buckles on the waistband and shoulder straps permit adjustment of the effective lengths of the several parts of this belt, to permit its size to be easily adjusted to suit the wearer.

While the invention has been disclosed herein by reference to the details of a preferred embodiment thereof, it is to be understood that such disclosure is intended in an illustrative, rather than in a limiting sense, and it is contemplated that various modifications in the construction and arrangement of the parts will readily occur to those skilled in the art, within the spirit of the invention and the scope of the appended claims.

I claim:

1. A safety belt comprising a waistband, a pair of shoulder straps, one of said straps to be worn over each shoulder of the wearer, and a connector strap, said waistband comprising an elongate strip, a pair of detachable fastener sections mounted at spaced locations on said waistband strip respectively for detachably securing the waistband about the body of the wearer, said connector strap being mounted to be worn in a generally upright position with its lower end secured to the waistband, means connecting the back ends of the shoulder straps to the upper end of the connector strap at a location to be disposed at the back of the wearer and for pivotal movement of the shoulder straps relative to the upper end of the connector strap and for movement of the shoulder straps relative to each other from one side of the waistband to the other at the front of the wearer, and means connecting the front ends of the shoulder straps to the waistband for sliding movement relative to the waistband to permit the respective positions of the front ends of the shoulder straps to be adjusted along the length of the waistband and from one side of the wearer to the other, one of said shoulder straps being formed with a downwardly dependent extension to provide a carrying sling below said waistband.

2. A safety belt in accordance with claim 1 wherein said connector strap is formed at its upper end with a tunnel loop for the convenient reception therein of the elongate shank of a fastener.

3. A safety belt comprising parts including a waistband, a pair of shoulder straps, one of said straps to be worn over each shoulder of the wearer, and a connector strap, the parts aforesaid all being elongate, flexible, ribbon-like strips and being formed from a laminate of a film of a fluorescent synthetic plastic material on a substantially white woven fabric backing, said strips being disposed with the plastic film forming the outer surface thereof, said film being embossed to increase its surface area, a pair of detachable fastener sections mounted at spaced locations on said waistband respectively for detachably securing the waistband about the body of the wearer, means for permitting adjustment of the effective length of the waistband between the two fastener sections, said connector strap being mounted to be worn in a generally upright position at the back of the wearer and with its lower end secured to the waistband to permit sliding movement along the length of the waistband to permit adjustment in the position of the connector strap, fastener means connecting the back ends of the shoulder straps to the upper end of the connector strap at a location to be disposed at the back of the wearer and for pivotal movement of the shoulder straps relative to the connector strap and for movement of the shoulder straps relative to each other from one side of the waistband to the other at the front of the wearer, and means connecting the front ends of the respective shoulder straps to the waistband for sliding movement relative to the waistband to permit the respective positions of the front ends of the shoulder straps to be adjusted along the length of the waistband and from one side of the wearer to the other, said shoulder straps being adjustable in their individual respective lengths, one of said shoulder straps being formed with a downwardly dependent looped extension that is disposed to be suspended below said waistband to provide a gun resting sling.

4. A safety belt in accordance with claim 3 wherein said connector strap is formed at its upper end with a tunnel loop for the convenient reception therein of the elongate shank of a fastener.

References Cited by the Examiner
UNITED STATES PATENTS

| | | | |
|---|---|---|---|
| 469,444 | 2/1892 | Frazier | 224—11 |
| 1,288,170 | 12/1918 | Pick | 224—5.15 |
| 2,576,559 | 11/1951 | Bennek | 224—5 |
| 3,089,143 | 5/1963 | Jacobson | 2—1 |

HUGO O. SCHULZ, *Primary Examiner.*